United States Patent
Kato

[11] Patent Number: 5,910,063
[45] Date of Patent: Jun. 8, 1999

[54] LUBRICATING STRUCTURE OF PLANETARY GEAR

[75] Inventor: Tatsuya Kato, Fuji, Japan

[73] Assignee: Jatco Corporation, Fuji, Japan

[21] Appl. No.: 08/917,284

[22] Filed: Aug. 25, 1997

[30]  Foreign Application Priority Data

Aug. 28, 1996  [JP]  Japan .................................. 8-227096

[51] Int. Cl.$^6$ .................................................. F16H 3/44
[52] U.S. Cl. ......................................... 475/159; 475/331
[58] Field of Search .................................. 475/159, 160, 475/331, 346; 184/6.12

[56]  References Cited

U.S. PATENT DOCUMENTS 5,230,664  7/1993  Michioka et al. ........................ 474/43

FOREIGN PATENT DOCUMENTS 61-48643  3/1986  Japan .

Primary Examiner—Khoi Q. Ta
Attorney, Agent, or Firm—Foley & Lardner

[57]  ABSTRACT

A thrust bearing is interposed between a carrier plate and a sun gear. Grooves are formed on a surface of a thrust race of the thrust bearing the surface of the thrust race opposes the carrier plate, so that the grooves connect a space at inner peripheral side of the thrust bearing with a space at outer peripheral side of the thrust bearing. A pinion shaft is formed with a longitudinal hole that opens at an axial end face of the pinion shaft, and with two radial holes that open at an outer peripheral surface of the pinion shaft. These radial holes communicate with the longitudinal hole to constitute the lubricating oil paths. An oil catcher is fixed to the axial end face of the pinion shaft to form a guide oil path, which extends from the vicinity of an outer peripheral surface of the thrust bearing to an aperture portion of the longitudinal hole along an outer surface of the carrier plate and the axial end face of the pinion shaft. The inner-most peripheral portion of the oil catcher is bent toward the sun gear to enlarge an opening portion of the guide oil path. A lubricating oil discharge opening is formed in an input shaft shaft, which opening opens near a space located at an inner peripheral side of the thrust bearing.

4 Claims, 4 Drawing Sheets

LUBRICATING STRUCTURE OF PLANETARY GEAR

BACKGROUND OF THE INVENTION

1. Field of the Invention

The present invention relates to a lubricating structure of a planetary gear, and in particular, to a lubricating structure where the supply of lubricating oil to a gap between an inner peripheral surface of a pinion and an outer peripheral surface of a pinion shaft constituting the planetary gear is made efficient.

2. Description of the Prior Art

A conventional technique of this type is disclosed, for example, in Japanese Patent Laid Open Publication No. 61-48643. That is, the conventional technique disclosed in this Publication relates to a forced lubricating mechanism of a planetary gear of an automatic transmission for vehicles. In this lubricating mechanism, an oil reservoir is fixed to a side surface of a planet carrier to supply lubricating oil to an aperture in a pinion shaft end face. An oil path is formed in the inside of the pinion shaft. A bearing having a thrust race is disposed between the planet carrier and a ring gear supporting member adjacent thereto so that the thrust race of the bearing is made to abut against the ring gear supporting member. An outer peripheral portion of the thrust race is bent toward the planet carrier side to overlap with the aperture portion of the oil reservoir, and furthermore, the planet carrier and the ring gear supporting member are made to receive a force at opposing sides thereof to each other. In this respect, as a concrete structure for making the the planet carrier and the ring gear supporting member to receive the force at opposing sides thereof to each other, in the case where a sun gear, a pinion, or a ring gear is transmitted with power in a direction of forward rotation while the vehicle is travelling, each gear is formed with a helical gear so that the sun gear and the ring gear supporting member receive a force at opposing sides thereof.

In such a structure, the lubricating oil flows outwardly in a radial direction between the planet carrier and the ring gear supporting member further, the lubricating oil flows through the bearing outwardly in the radial direction, and is supplied to the oil reservoir so that the lubricating oil is supplied from the oil reservoir to a bearing interposed between the outer peripheral surface of the pinion shaft and the inner peripheral surface of the pinion through the oil path in the inside of the pinion shaft, and to a thrust washer interposed between the planet carrier and the pinion end face. However, since the mutually opposing sides of the planet carrier and the ring gear supporting member receive the force, the thrust race of the bearing is pressed against the ring gear supporting member, and the formation of a gap between the thrust race and the ring gear supporting member is prevented. Thus, a large part of the lubricating oil flowing between the planet carrier and the ring gear supporting member is moved along the planet carrier so that a relatively large quantity of the lubricating oil can be supplied to the oil reservoir reliably.

However, in the conventional technique disclosed in the publication, it is structured so that the planet carrier and the ring gear supporting member receive the force at mutually opposing sides thereof thereby to achieve advantageous effect as mentioned above. However, in order to realize this, it is necessary to form each gear with a helical gear twisted in a predetermined twisting direction, and depending on the twisting direction of the helical gear, it is impossible to divert a helical broach, which is used to manufacture other helical gears to manufacture the helical gear twisted in the predetermined twisting direction. A new helical broach, which meets the predetermined twisting direction, will be required resulting in the increase of manufacturing cost.

Furthermore, it is only during forward rotation that the thrust race is pressed against the ring gear supporting member. During reverse rotation, a gap is formed between the thrust race and the ring gear supporting member. The lubricating oil flows out through the gap. This creates a problem in that the amount of lubricating oil that can be supplied to the oil reservoir is decreased.

In this respect, in order to solve such a problem, it will be considered, for example, to provide a spring between the thrust race and the ring gear supporting member to press the thrust race against the ring gear supporting member. However, there is a drawback in that such a measure increases the number of parts, the man-hours, and the cost so that it is not an effective resolution.

SUMMARY OF THE INVENTION

The present invention was made in view of the unsolved problems involved in the conventional technique, and it is an object to provide a lubricating structure of a planetary gear, which structure enables to efficiently supply lubricating oil into a gap between an inner peripheral surface of a pinion and an outer peripheral surface of a pinion shaft.

In order to achieve the above-mentioned object, in a first aspect of the invention, a lubricating structure of a planetary gear comprises a pinion shaft having a pinion rotatably fitted or positioned around the pinion shaft, a pair carrier plates holding the pinion shaft at opposite end portions thereof, an internal lubricating oil path formed in the inside of the pinion shaft, the oil path extending from an axial end face of the pinion shaft at the side of one of the carrier plates to an outer peripheral surface of the pinion shaft, a thrust bearing interposed between the one carrier plate and a member axially adjacent thereto so that the thrust bearing is positioned at a radially inner position with respect to the pinion shaft, a lubricating oil discharge opening located at a radially inner position with respect to the thrust bearing, and a guide member fixed to the axial end face of the pinion shaft at a radially outer position with respect to the thrust bearing for guiding a flow of the lubricating oil into the internal lubricating oil path, wherein a groove is formed between the thrust bearing and the one carrier plate to connect a space at radially inner side of the thrust bearing with a space at radially outer side of the thrust bearing.

In a second aspect of the invention, the lubricating structure of a planetary gear has a groove formed in a thrust race of the thrust bearing, with the thrust race abutting against the one of the carrier plates.

In a third aspect of the invention, the lubricating structure of a planetary gear has a groove formed in the one of the carrier plates.

In a fourth aspect of the invention, the lubricating structure of a planetary gear has a groove formed in a plate member, which is interposed between the the thrust bearing and the one of the carrier plates.

In the first aspect of the invention, the lubricating oil, which is discharged from the lubricating oil discharge opening and flows into a space between the one carrier plate and a member axially adjacent thereto, is first supplied to the thrust bearing interposed between the one planet carrier and the member so that the lubrication is performed between a rolling member and a rolling surface of the thrust race constituting the thrust bearing. Then, the lubricating oil passes through the thrust bearing and moves to the radially outer side thereof, and guided into the internal lubricating oil path by a the guide member. However, a part of the lubricating oil reaching the thrust bearing passes through the groove formed between the thrust bearing and the one carrier plate, and the lubricating oil that passed through the groove moves surely along an axial end surface or an outer surface of the one of the carrier plates. Thus, the guide member guides a relatively large amount of lubricating oil.

In other words, since the guide member is a member that guides the flow of the lubricating oil into the internal lubricating oil path, which opens at the axial end face of the pinion shaft, the larger the amount of lubricating oil moving along the one of the carrier plates, which holds one axial end portion of the pinion shaft, the larger the amount of lubricating oil flowing into the internal lubricating oil path. When the large amount of lubricating oil flows into the internal lubricating oil path, a sufficient amount of lubricating oil is supplied to the outer peripheral surface of the pinion shaft, and satisfactory lubrication is performed.

Moreover, even when a force is imparted between the one of the carrier plates and its axially adjacent member to make them approach each other, or a force is imparted to make them spread apart from each other, since the groove is always formed between the thrust bearing and the one carrier plate, the amount of lubricating oil guided by the guide member is never changed by a direction of rotation of the gear. Hence there is no need to provide, for example, a spring to press the thrust bearing against the one of the carrier plate, and it is advantageous in the cost, and there is no restriction for a space by providing such a spring.

The groove formed between the thrust bearing and the one of the carrier plates may be formed in the thrust race of the thrust bearing, or in the one planet carrier, or in a plate member interposed between the thrust bearing and the one of the carrier plates. In any of these grooves, the desired effect can be obtained.

DESCRIPTION OF THE PREFERRED EMBODIMENTS

Embodiments of the present invention will be described with respect to the drawings.

Figure 1:
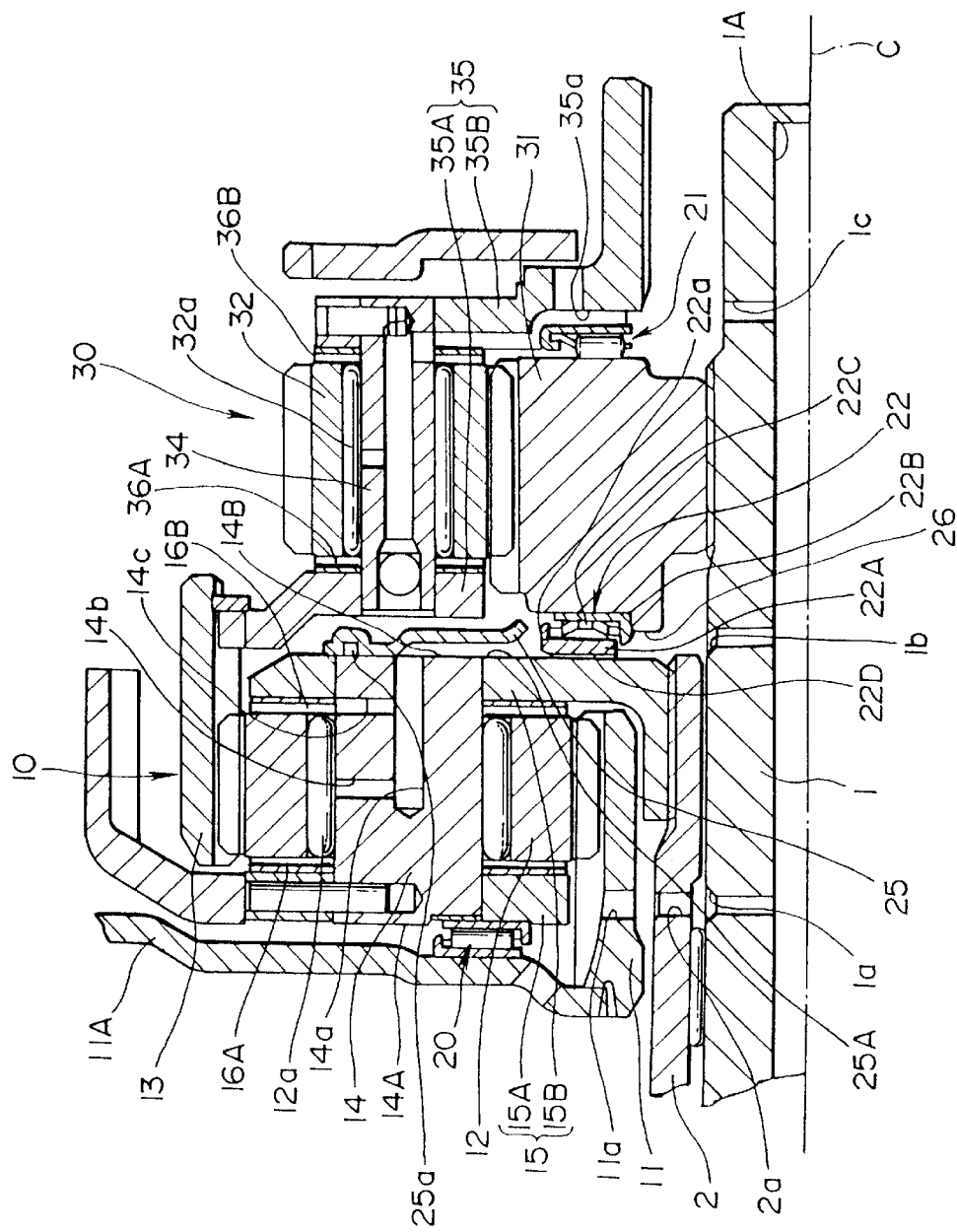
FIG. 1 is a sectional view, of a structure in a first embodiment of the present invention.
Figures 2A, 2B:
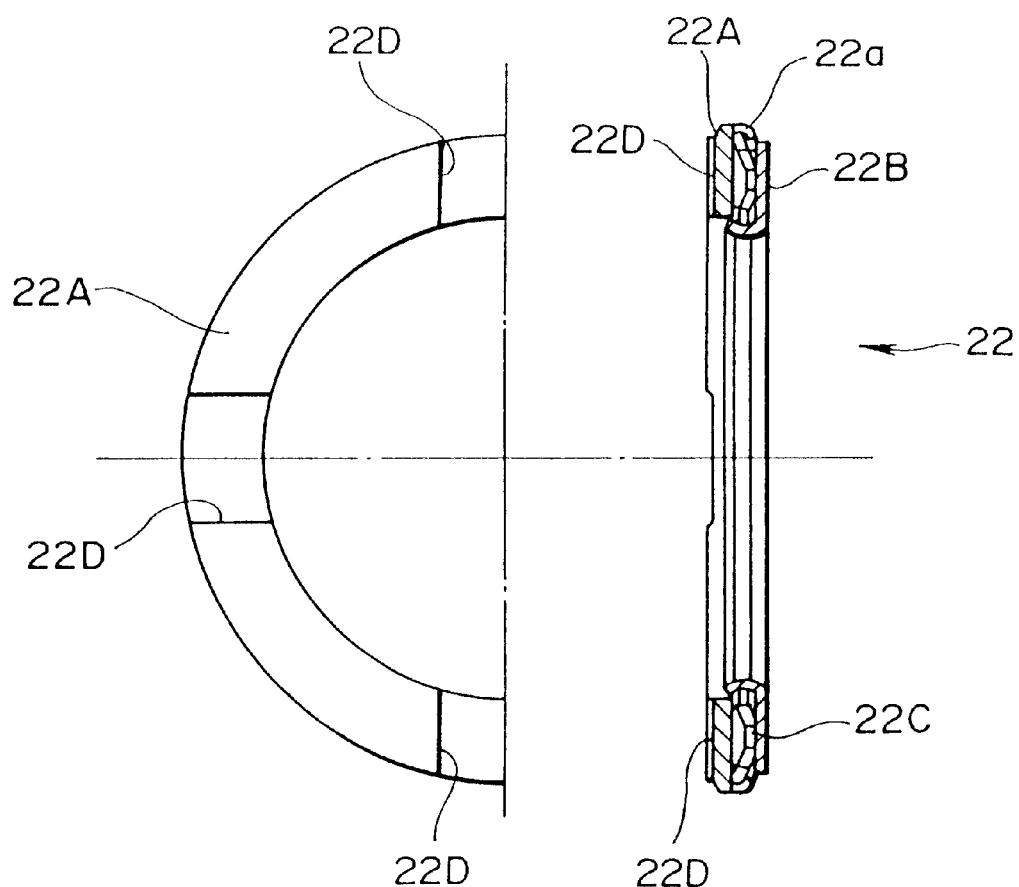
FIGS. 2A and 2B are respectively front and sectional views showing a structure of a thrust bearing

FIGS. 1 and 2A and 2B show a first embodiment of the present invention. FIG. 1 is a partial sectional view of an automatic transmission for vehicles with a planetary gear according to the present invention.

First, the structure will be explained. This automatic transmission for vehicles includes a front planetary gear 10 and a rear planetary gear 30, which are coaxial with an axis of rotation C of an input shaft 1.

The front planetary gear 10 includes a sun gear 11, a plurality of pinions 12 (only one is shown in FIG. 1), and a ring gear 13, which engages respective pinion 12. The pinion 12 is fitted around a pinion shaft 14 through a rolling bearing 12a, and opposite end portions of the pinion shaft 14 are held relatively unrotatable by carrier plates 15A and, which constitute a planet carrier 15. In this regard, the axial end portions of the pinion shaft 14 respectively penetrate the carrier plates 15A and 15B, and its axial end faces 14A and 14B reach outer surfaces of the carrier plates 15A and 15B. Furthermore, an inner peripheral portion of the carrier plate 15B, which is near the rear planetary gear 30 extends to the vicinity of the input shaft 1, and an inner peripheral surface of the carrier plate 15B is spline coupled with a planet shaft 2, which is fitted around the input shaft 1 rotatably relative to each other.

A pair of thrust washers 16A and 16B are respectively interposed between opposite end faces of the pinion 12 and their corresponding inner faces of the carrier plates 15A and 15B. The pinion 12 is made rotatable relative to the pinion shaft 14 by these thrust washers 16A and 16B and the roller bearing 12a.

An end portion of the sun gear 11 of the front planetary gear 10 opposite to the carrier plate 15B side is fixed to a sun gear supporting member 11A, which extends to radially outer side (the far side from the axis of rotation C in FIG. 1). A thrust bearing 20 is interposed between the sun gear supporting member 11A and an outer surface of the carrier plate 15A.

On the other hand, the rear planetary gear 30 includes a sun gear 31 having its inner peripheral side spline coupled with the input shaft 1, a plurality of pinions 32 (only one is shown in FIG. 1) engage the sun gear 31, and a ring gear (not shown) engages respective pinion 32, and the pinion 32 is fitted around a pinion shaft 34 through a roller bearing 32a. Opposite end portions of the pinion shaft 34 are held relatively unrotatable by carrier plates 35A and 35B, which constitute a planet carrier 35. An outer peripheral portion of the carrier plate 35A at the front planetary gear 10 side is spline coupled with an inner peripheral surface of the ring gear 13 of the front planetary gear 10, and the other carrier plate 35B is spline coupled with an output shaft (not shown), which is provided coaxially with the input shaft 1.

A pair of thrust washers 36A and 36B are respectively interposed between opposite end faces of the pinion 32 and their corresponding inner faces of the carrier plates 35A and 35B. The pinion 32 is made rotatable relative to the pinion shaft 34 by these thrust washers 36A and 36B and the roller bearing 32a.

Furthermore, a lubricating oil groove 35a is formed in an inner surface of the carrier plate 35B, and a thrust bearing 21 is interposed between the carrier plate 35B and the sun gear 31.

Moreover, a thrust bearing 22 is interposed between an inner surface of the sun gear 31 opposite to the carrier plate 35B side and the carrier plate 15B. Here, the thrust bearing 22 includes, as shown in FIG. 2B, a thrust race 22A that abuts against the carrier plate 15B, a thrust race 22B that abuts against the sun gear 31, and a rolling member 22C that rolls between the thrust races 22A and 22B. And four grooves 22D are formed radially with respect to its axis line with equal angular intervals of 90 degrees circumferentially in a surface at the carrier plate (15B) side of the thrust race 22A, so that the grooves 22D connect a space at the inner peripheral side with a space at the outer peripheral side of the thrust bearing 22, and are positioned at radially inner side (the side near the axis of rotation C in FIG. 1) with respect to the holding position of the pinion shaft 14. An outer peripheral portion of the thrust race 22A is bent toward the thrust race 22B to form a bent portion 22a.

Here in this embodiment, the pinion shaft 14 of the front planetary gear 10 is bored with an axial hole (or a longitudinal hole) 14a extending from the axial end face 14B of the pinion shaft 14 along the axis line to a position some distance beyond the axial center portion. A radial hole 14b extends radially (a vertical direction in FIG. 1) from the axial center portion on an outer peripheral surface of the pinion shaft 14 into the inside to reach the longitudinal hole 14a communicate therewith. A further radial hole 14c is bored extending from a position on the outer peripheral surface of the pinion shaft 14 surrounded by the thrust washer 16B radially into the inside to reach the longitudinal hole 14a and communicate therewith.

Furthermore, an oil catcher 25 is fixed to the axial end face 14B of the pinion shaft 14 as a guide member, and the oil catcher 25 forms a guide oil path 25A defined between the oil catcher 25 and the axial end face 14B extending from the vicinity of the outer peripheral surface of the thrust bearing 22 to an aperture portion of the longitudinal hole 14a. The oil catcher 25 is a thin ring-shaped member and a radially outer portion thereof, with respect to the aperture portion of the longitudinal hole 14a, is affixed to the axial end face 14B with a seal ring 25a interposed between the radially outer portion of the oil catcher 25 and the axial end face 14B. A radially inner portion thereof with respect to the aperture portion of the longitudinal hole 14a is spaced from the axial end face 14B and the carrier plate 15B to form the guide oil path 25A. Moreover, in this embodiment, the inner-most peripheral portion of the oil catcher 25 is bent toward the sun gear (31) side to enlarge an aperture portion of the guide oil path 25A.

Furthermore, the input shaft 1 is formed with a lubricating oil supply path 1A in the inside thereof extending coaxially with the input shaft 1, and a plurality of lubricating oil discharge openings 1a, 1b, and 1c, which open in the outer peripheral surface of the input shaft 1.

Among these, the lubricating oil discharge openings 1a is formed at a position that is covered by the planet shaft 2. However, the lubricating oil discharged from the lubricating oil discharge opening 1a is supplied to a space in the vicinity of an inner peripheral portion of the carrier plate 15A through a through hole 2a formed in the planet shaft 2, and a through hole 11a formed in the sun gear 11, so that the thrust bearing 20, the thrust washer 16A, and an engaging portion between the sun gear 11 and the pinion 12 are lubricated. Also, the lubricating oil discharge opening 1c opens at a position opposing an inner peripheral surface of the carrier plate 35B, and the lubricating oil discharged from the lubricating oil discharge openings 1c lubricates the thrust bearing 21, and at the same time, the lubricating oil passing through the thrust bearing 21 lubricates the thrust washer 36B, the roller bearing 32a, and an engaging portion between the sun gear 31 and the pinion 32.

The lubricating oil discharge opening 1b opens toward a gap 26 formed between the carrier plate 15B and the sun gear 31, and the lubricating oil discharged from the lubricating oil discharge opening 1b is supplied to the gap 26.

Next, the operation in the present embodiment will be described.

Under the condition where each gear of the front planetary gear 10 and the rear planetary gear 30 is driven into rotation according to a transmission ratio, the lubricating oil within the lubricating oil supply path 1A is discharged to the outside of the input shaft 1 through each of the lubricating oil discharge openings 1a to 1c due to the influence of a centrifugal force caused by the rotation of the input shaft 1. The lubricating oil discharged from the lubricating oil discharge opening 1a lubricates the thrust bearing 20 and the thrust washer 16A, and the lubricating oil discharged from the lubricating oil discharge opening 1c lubricates the thrust bearing 21, -the thrust washer 36A, and the roller bearing 32a.

The lubricating oil discharged from the lubricating oil discharge opening 1b flows into the gap 26, and then moves radially and outwardly within the gap 26 to reach the thrust bearing 22. Thus, the thrust races 22A and 22B, and rolling member 22C of the thrust bearing 22 are lubricated. The lubricating oil which has been used for lubricating the inside of the thrust bearing 22 tends to further move radially and outwardly under the influence of the centrifugal force. However, since the direction of the flow of the lubricating oil is regulated by the bent portion 22a formed at the outer peripheral portion of the thrust race 22A, when the lubricating oil moves to a space at the radially outside of the thrust bearing 22, the lubricating oil flows along the sun gear 31, and thus, an engaging portion between the sun gear 31 and the pinion 32, the thrust washer 36A, and the like are lubricated.

On the other hand, part of the lubricating oil, which flows into the gap 26 from the lubricating oil discharge opening 1b and reaches the thrust bearing 22, passes through the grooves 22D and reaches a space radially outside of the thrust bearing 22, and then, moves along the carrier plate 15B radially and outwardly. As a result, part of the lubricating oil surely flows into the guide oil path 25. In other words, in the present invention, since the grooves 22D are formed, part of the lubricating oil in the gap 26 can be fed into the oil catcher 25 without fail.

In particular, in the present embodiment, the guide oil path 25A formed by the oil catcher 25 is made to extend in the vicinity of the outer peripheral surface of the thrust bearing 22. Furthermore, the inner peripheral portion of the oil catcher 25 is bent outwardly with respect to the carrier plate 15B to enlarge the opening portion of the guide oil path 25A. As a result, it is possible to feed the lubricating oil passing through the grooves 22D into the guide oil path 25A with very high certainty. Accordingly, when a sectional area of the grooves 22D is selected appropriately, a sufficient amount of lubricating oil can be surely supplied into the guide oil path 25A.

The lubricating oil supplied to the guide oil path 25A formed by the oil catcher 25 is further moved radially and outwardly due to the influence of the centrifugal force to flow into the longitudial hole 14a, and from there moves radially and outwardly through the radial holes 14b and 14c so that the roller bearing 12a and the thrust washer 16B are satisfactorily lubricated. Furthermore, by aligning the position of the grooves 22D with the holding position of the pinion shaft 14 in a direction of rotation, it is possible to align the grooves 22D with the an aperture portion of the longitudial hole 14a in a radial direction, Thus, the lubricating oil passing through the grooves 22D can be supplied to the longitudial hole 14a with a minimum distance.

Furthermore, even when a force is imparted to the carrier plate 15B and the sun gear 31 in a direction to separate them to approach to each other, or to bring them apart from each other, since the grooves 22D are always formed, the amount of lubricating oil flowing into the oil catcher 25 is never reduced by on the direction of rotation to the gear. In addition, as the working required is only to form the grooves 22D in the thrust race 22A, and there is no need to provide a spring or the like to press the thrust race 22B against the sun gear 31, it is advantageous in cost there is no spring or the like to restrict space.

Here in the present invention, the longitudial hole 14a and the radial holes 14b and 14c correspond to the internal lubricating oil path in the first aspect of the invention, and the sun gear 31 corresponds to the member (which is adjacent to the planet carrier in the axial direction).

Figure 3:
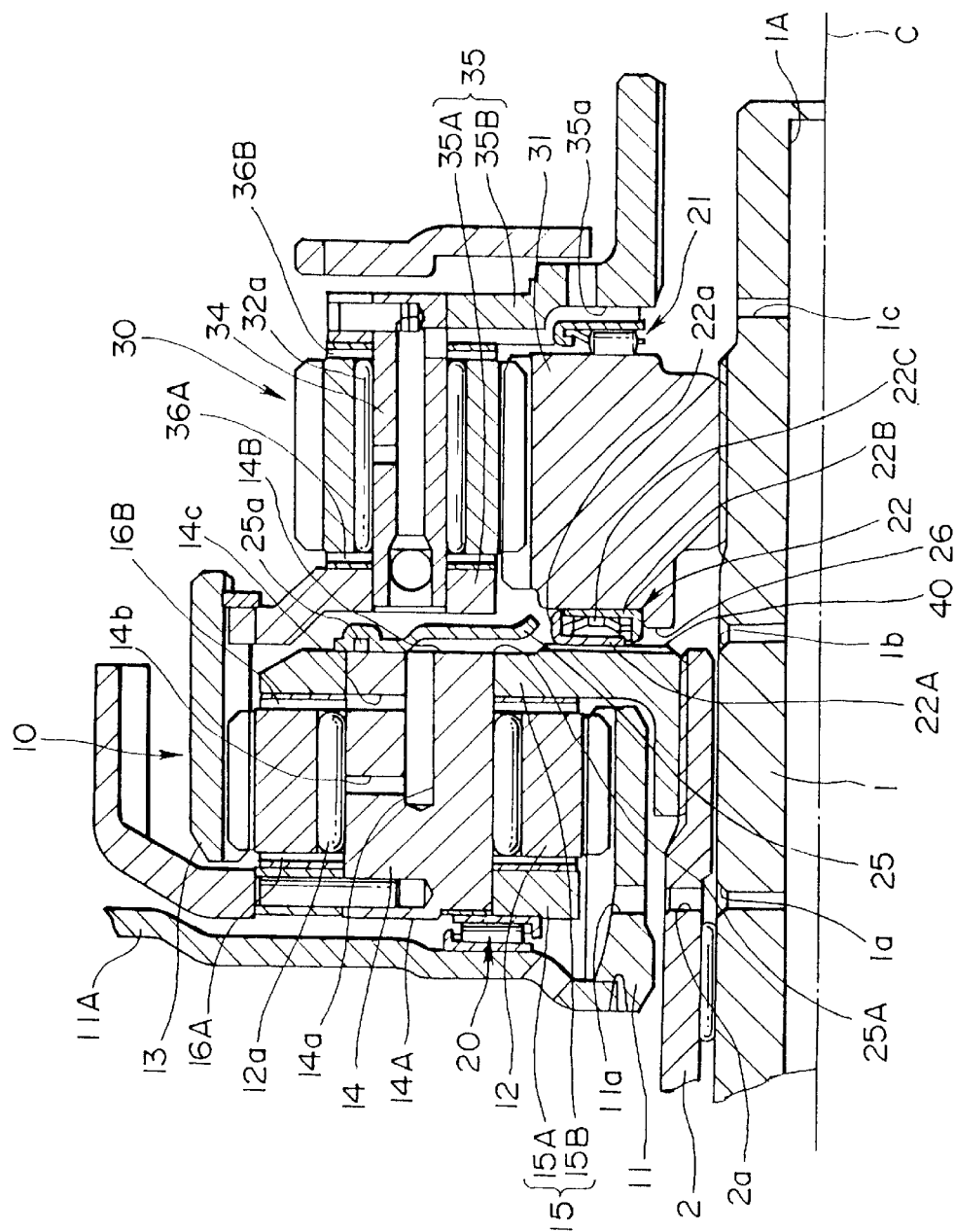
FIG. 3 is a sectional view of a structure in a second embodiment of the present invention.

FIG. 3 is a partial sectional view of an automatic transmission for vehicles incorporating a planetary gear according to the second embodiment of the present invention which is, similar to FIG. 1. Parts and positions similar to those in the first embodiment are labelled with similar reference numerals and duplicate explanation is omitted.

Specifically, in the second embodiment, the grooves are not formed in the thrust race 22A of the thrust bearing 22. Instead, grooves 40 are formed in an axially outer surface of the carrier plate 15B against which the thrust race 22A abuts so that at least some of the grooves 40 extend in a radial direction. The number of the grooves 40 and the forming positions thereof are similar to that of the first embodiment.

Also in such structure, a part of the lubricating oil flows into the gap 26 from the lubricating oil discharge opening 1b and then reaches a space at radially and outer side of the the thrust bearing 22 after passing through grooves 40. Then the part of the lubricating oil further moves radially and outwardly along the carrier plate 15B. As a result, similar to the first embodiment, a sufficient amount of lubricating oil can be supplied to the guide oil path 25A covered by the oil catcher 25, and the roller bearing 12a and the thrust washer 16B are lubricated satisfactorily. Also, other advantageous effects can be obtained similarly to the first embodiment.

Figure 4:
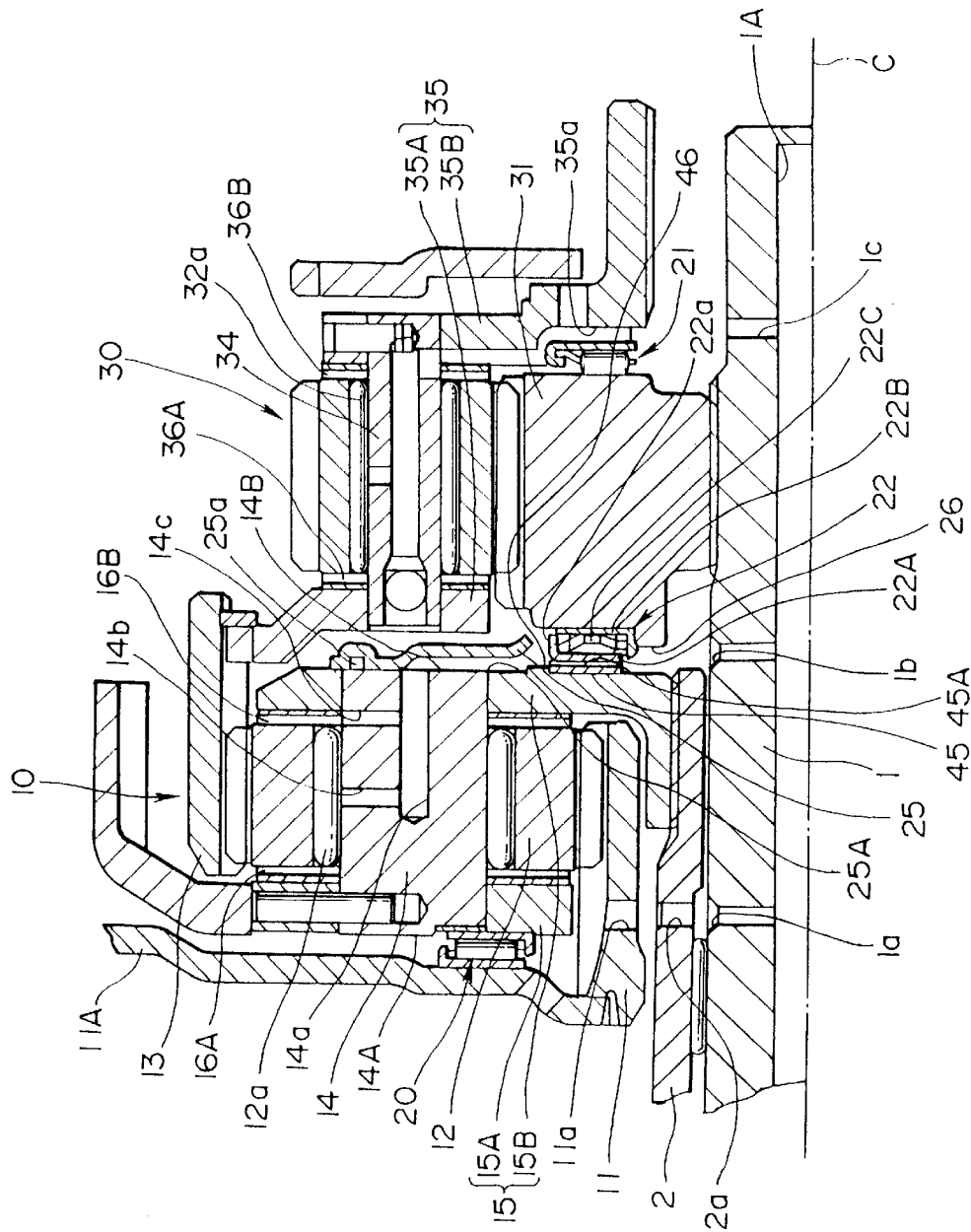
FIG. 4 is a sectional view of a structure in a third embodiment of the present invention.

FIG. 4 is a partial sectional view of an automatic transmission for vehicles incorporating a planetary gear according to the third embodiment of the present invention, which is similar to FIG. 1. Parts and positions similar to those in the first embodiment are labelled with similar reference numerals and duplicate explanation is omitted.

Specifically, in the present embodiment, a thin ring-shaped plate member, for example, a plate member 45 made of synthetic resin is sandwiched between the thrust race 22A of the thrust bearing 22 and the carrier plate 15B. In a surface of the plate member 45 opposing the thrust race 22A, grooves 45A are formed to connect an inner peripheral side with an outer peripheral side of the plate member 45. The number of grooves 45A and the forming positions thereof are similar to that of the grooves 22D in the first embodiment. Furthermore, a ring-shaped continuous convex portion 46 is formed on the axial outer surface of the carrier plate 15B at the sun gear 31 side so that the convex portion 46 abuts against the outer peripheral surface of the ring-shaped plate member 45 to facilitate the positioning of the plate member 45.

Also in such a structure, part of the lubricating oil flows into the gap 26 from the lubricating oil discharge opening 1b and then reaches a space at radially and outer side of the the thrust bearing 22 after passing through the grooves 45. Then, the part of the lubricating oil further moves radially and outwardly along the carrier plate 15B. As a result, similar to the first embodiment, a sufficient amount of lubricating oil can be supplied to the guide oil path 25A covered by the oil catcher 25, and the roller bearing 12a and the thrust washer 16B are lubricated satisfactorily. Also other advantageous effects can be obtained similarly to the first embodiment.

As described in the foregoing, in the present invention, a groove is formed between the thrust bearing and a planet carrier, the thrust bearing being interposed between the planet carrier (carrier plate) and a member axially adjacent to the planet carrier, so that the groove connects a space at a radially inner side of the thrust bearing with a space at a radially outer side of the thrust bearing. As a result, an advantage is offered in that it is possible to efficiently supply lubricating oil to an inner peripheral surface of a pinion and an outer peripheral surface of a pinion shaft.

I claim:

1. A lubricating structure of a planetary gear, comprising:

a pinion shaft having a pinion rotatably positioned around the pinion shaft;

a pair of carrier plates holding the pinion shaft at opposite end portions thereof;

an internal lubricating oil path formed in the inside of the pinion shaft, the oil path extending from an axial end face of the pinion shaft at a side of one of the carrier plates to an outer peripheral surface of the pinion shaft;

a thrust bearing adjacent to the one carrier plate at a radially inner position relative to the pinion shaft; and a guide member fixed to the axial end face of the pinion shaft at a radially outer position with respect to the thrust bearing for guiding the lubricating oil into the internal lubricating oil path, wherein a groove is formed between the thrust bearing and the one carrier plate to connect a space at radially inner side of the thrust bearing with a space at radially outer side of the thrust bearing to allow the lubricating oil to flow therethrough to the guide member.

2. A lubricating structure of a planetary gear according to claim 1, wherein the thrust bearing has a thrust race abutting against the one carrier plate and the groove is formed in the thrust race.

3. A lubricating structure of a planetary gear according to claim 1, wherein the groove is formed in the one carrier plate.

4. A lubricating structure of a planetary gear according to claim 1, further including a plate member interposed between the thrust bearing and the one carrier plate, and the groove is formed in the plate member.

* * * * *